United States Patent [19]

Tseng et al.

[11] Patent Number: 5,384,111
[45] Date of Patent: Jan. 24, 1995

[54] MAGNESIUM-ENHANCED LIME SCRUBBING OF SULFUR DIOXIDE WITH PRODUCTION OF A HIGH SOLIDS CONTENT SLUDGE

[75] Inventors: Shiaw C. Tseng, Pittsburgh; Daniel W. Berisko, Coraopolis; Manyam Babu, Upper St. Clair, all of Pa.

[73] Assignee: Dravo Lime Company, Pittsburgh, Pa.

[21] Appl. No.: 191,413

[22] Filed: Feb. 3, 1994

[51] Int. Cl.$^6$ ............................................. C01B 17/48
[52] U.S. Cl. ........................... 423/242.1; 423/243.01; 423/243.08
[58] Field of Search ............. 423/242.1, 242.7, 243.01, 423/244.08, 244.09, 243.08

[56] References Cited

U.S. PATENT DOCUMENTS

| | | | |
|---|---|---|---|
| 3,888,968 | 6/1975 | Atsukawa et al. | 423/242 |
| 3,972,980 | 8/1976 | Lowell | 423/242 |
| 4,283,373 | 8/1981 | Frech et al. | 423/226 |
| 4,454,101 | 6/1984 | Garrison et al. | 423/242 |
| 4,612,175 | 9/1986 | Harkness et al. | 423/235 |
| 4,670,234 | 6/1987 | Holter et al. | 423/235 |
| 4,780,290 | 10/1988 | Curtius | 423/244 |
| 4,957,716 | 9/1990 | Cichanowicz et al. | 423/242 |
| 4,994,246 | 2/1991 | Moser et al. | 423/242 |
| 5,200,160 | 4/1993 | Benson et al. | 423/235 |
| 5,202,103 | 4/1993 | Chang et al. | 423/242.7 |
| 5,246,677 | 9/1993 | Moser et al. | 423/243 |
| 5,246,679 | 9/1993 | Moser et al. | 423/243 |

OTHER PUBLICATIONS

The Aqueous Sulfite-Nitride System: Investigations On The Mutagenicity of Some Known Products—Chemosphere, vol. 16, Nos. 10–12, pp. 2479–2485, 1987.
The Reduction of Nitrites To Hydroxylamine By Sulfites By G. K. Rollefson and C. F. Oldershaw, Mar. 1932.
Postassium Nitrilosulfonate—Sisler H.: Audrieth, L. F. J.A.C.S. 1938 Aug. 60, 1947–1948.
Kinetics of the Formation of Hydroxylamine Disulfonate by Reaction of Nitrite with Sulfites—S. B. Oblath, S. S. Markowitz, T. Novakov, and S. G. Chang, J. Phy. Chem., 1981, 85, 1017–1021.

*Primary Examiner*—Gary P. Straub
*Assistant Examiner*—Timothy C. Vanoy
*Attorney, Agent, or Firm*—Armstrong, Westerman, Hattori, McLeland & Naughton

[57] ABSTRACT

Sulfur dioxide is removed from a gaseous stream using an aqueous scrubbing medium containing calcium components and magnesium ions, so as to produce a more readily dewatered aqueous calcium sulfite-containing sludge by providing in the aqueous scrubbing medium in an aqueous scrubbing unit an effective amount of at least one amine sulfonate ion of the formula:

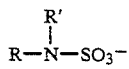

where R is H or OH, and R' is H or $SO_3$, with R and R' not both being H. The amine sulfonate ion is preferably provided by adding an amine disulfonate salt having the formula $HN(SO_3X)_2$ or a hydroxylamine monosulfonate salt having the formula $HO—NH—(SO_3X)$, when X is an alkali or alkaline earth metal. Or an effluent stream from a scrubbing unit for nitrogen oxides containing a metal chelate and an amine sulfonate may be added to provide the amine sulfonate ion.

14 Claims, 2 Drawing Sheets

MAGNESIUM-ENHANCED LIME SCRUBBING OF SULFUR DIOXIDE WITH PRODUCTION OF A HIGH SOLIDS CONTENT SLUDGE

FIELD OF THE INVENTION

The present process relates to a method of removing sulfur dioxide from hot gaseous streams using an aqueous lime scrubbing medium containing magnesium ions, so as to produce a by-product sludge containing primarily calcium sulfite where the by-product sludge is readily dewatered to a higher solids content than that normally produced by such a process.

BACKGROUND OF THE INVENTION

Various processes have been provided for the removal of sulfur dioxide from gaseous streams, such as combustion gases from fossil fuel-fired power plants, so as to reduce acidic components discharged into the air and prevent pollution of the environment. Some such processes are preferable to others for various reasons, either economic reasons, ease of operation, dependability, efficiency, and other factors. All such processes, however, have one or more factors that could be improved upon.

An especially useful process for removing sulfur dioxide from flue gases is the wet process where the flue gas is contacted in an aqueous slurry of lime that contains an effective amount of magnesium ions to enhance the process. Such a process is commercially used and is generally described in U.S. Pat. Nos. 3,919,393, 3,919,394, 3,914,378, 4,976,937 and other publications. This process has been commercially proven and is economical, easy to operate, dependable and efficient. Such a process, however, does produce an aqueous sludge of primarily calcium sulfite which is difficult to dewater. In conventional operation of such a magnesium-enhanced lime scrubbing process, the moisture content of the sludge produced, after dewatering, is relatively high, with a solids content in the range of 25–48 percent by weight achieved, depending upon the design of the process and the conditions of the process operation.

Efforts have been made to provide for better dewatering of aqueous sludges produced by lime scrubbing processes that contain calcium sulfites. For example, U.S. Pat. No. 4,454,101 describes a method where a predetermined amount of thiosulfate ions are provided in a scrubbing loop that produces sulfite-containing liquor slurries where the presence of the thiosulfate ions is said to produce calcium sulfite hemihydrate in a tabular prismatic mode and substantially eliminates the occurrence of porous lamellar aggregates of randomly oriented micaceous crystallites of the calcium sulfite hemihydrate so as to increase the settling rate and enable the ultimate dewatering of the sludge to a high solids content by weight. Another process proposed to produce large, regularly shaped calcium sulfite solids in a calcium-based flue gas desulfurization system is described in U.S. Pat. No. 5,246,679, which provides for the addition of a chemical crystal modifier, preferably an organophosphonate, to the calcium sulfite-containing slurry produced by a flue gas desulfurization process under inhibited oxidation conditions. This method is said to produce large, thick, substantially uniformly sized calcium sulfite crystals that exceed significantly 50 microns. Other modifiers suggested include carboxylic acids, polyacrylates, sulfonates, organic phosphates and polyphosphates.

SUMMARY OF THE INVENTION

The invention is an improved process for removing sulfur dioxide from a gaseous stream by contact with an aqueous scrubbing medium containing calcium components and between about 2,500 to 10,000 parts per million of magnesium ions in a wet scrubbing unit, where calcium sulfite solids are produced and removed as an effluent from the wet scrubbing unit as an aqueous sludge, so as to increase the solids content of the aqueous sludge produced and provide a more readily dewatered aqueous sludge. The improved process is effected by providing in the aqueous scrubbing medium in the aqueous scrubbing unit an effective amount, and preferably between about 10–800 millimoles, of at least one amine sulfonate ion of the formula:

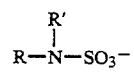

where R is H or OH, and R' is H or SO$_3$, with R and R' not both being H.

Preferably, the amine sulfonate ion is provided by adding an amine disulfonate salt having the formula HN(SO$_3$X)$_2$ or a hydroxylamine monosulfonate salt having the formula HO—NH—(SO$_3$X), where X is a metal selected from the group consisting of alkali metals and alkaline earth metals, preferably potassium and sodium. Or, the amine sulfonate ion can be provided by adding to the aqueous scrubbing medium a portion of an effluent stream from a scrubbing unit for nitrogen oxides containing a metal chelate, which effluent stream contains an amine sulfonate such as an amine disulfonate.

The presence of the amine sulfonate ion described above results in a calcium sulfite solids sludges which are more readily dewatered to a high solids content for subsequent disposal.

BRIEF DESCRIPTION OF THE DRAWINGS

The invention will become more readily apparent from the following description of preferred embodiments thereof shown, by way of example only, in the accompanying drawings, where.

DETAILED DESCRIPTION

Figure 1:
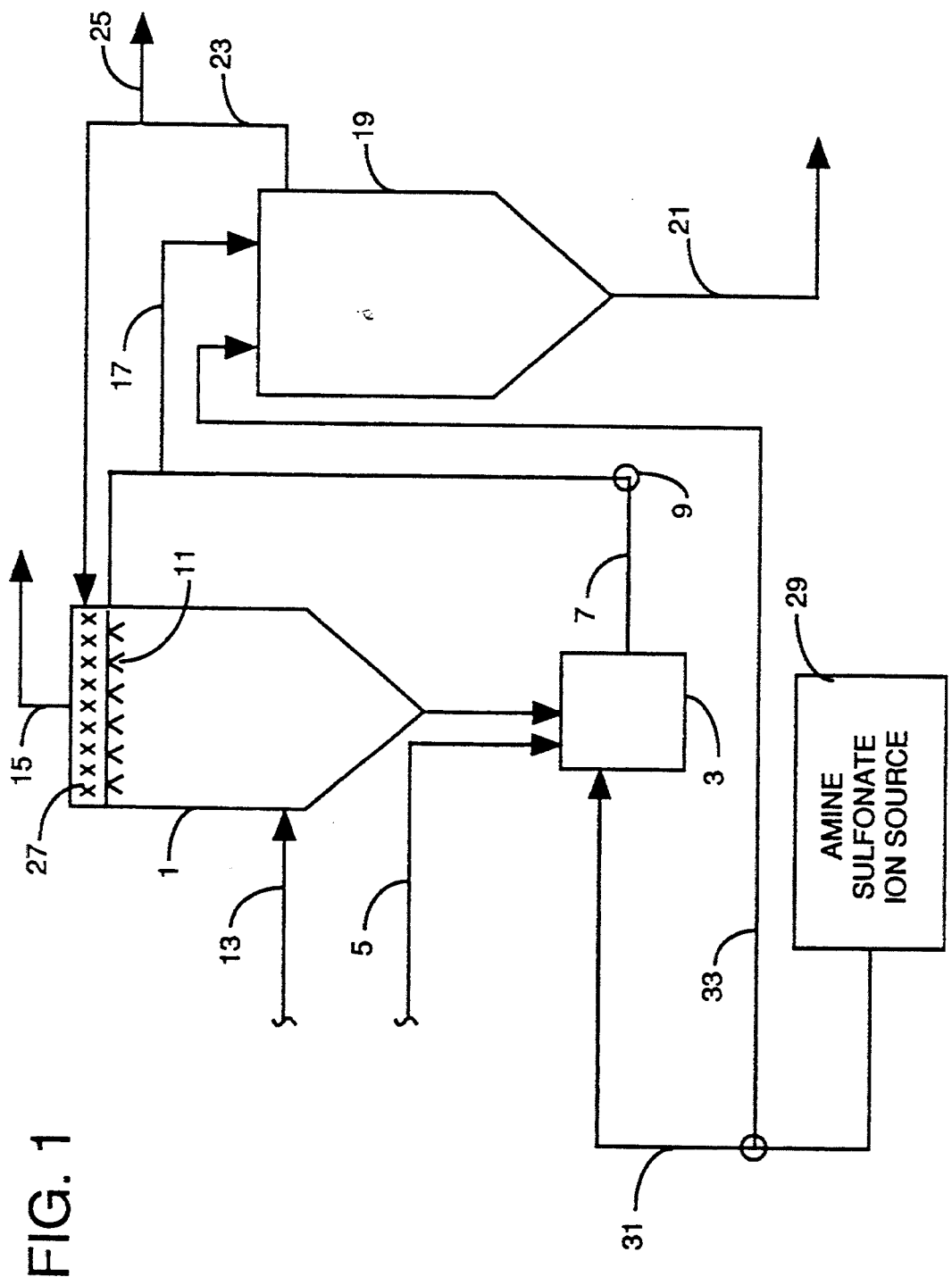
FIG. 1 is a schematic illustration of one embodiment of process of the present invention.

The present invention provides a process for removing sulfur dioxide from hot combustion gases using a magnesium-enhanced aqueous lime scrubbing medium where a more readily dewatered aqueous sludge is produced.

In the present process, a hot combustion gas containing sulfur dioxide is contacted with an aqueous scrubbing medium containing lime, and a magnesium ion content of between about 2,500 to 10,000 parts per million, in a wet scrubbing unit under conditions that inhibit oxidation of sulfites produced to sulfates, so as to produce a magnesium sulfite containing effluent from the wet scrubbing unit. Such magnesium-enhanced lime scrubbing systems are described, for example, in U.S. Pat. Nos. 3,919,393, 3,919,394, 3,914,378 and 4,976,937, which are all incorporated by reference herein, and which are assigned to the assignee of the present invention.

The effluent or bleed stream from the wet scrubbing unit in magnesium-enhanced lime scrubbing processes generally contains calcium sulfite in hemihydrate form as rosette-like crystalline shapes which are difficult to dewater and form a thixotropic sludge that is difficult to dewater for subsequent disposal.

We have found that the aqueous sludges from magnesium-enhanced lime scrubbing processes can be more readily dewatered if an effective amount of an amine sulfonate ion is provided to the system so as to be present in the aqueous scrubbing medium in the wet scrubbing unit. The amine sulfonate ion useful in the present process is one having the formula:

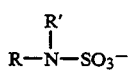

where R is H or OH, and R' is H or $SO_3$, with R and R' not both being H.

In one embodiment of the present process, the above-defined amine sulfonate ion is provided in the magnesium-enhanced aqueous lime scrubbing medium by adding thereto an alkali metal or alkaline earth metal amine sulfonate salt, such as a potassium amine sulfonate salt or a sodium amine sulfonate salt, in solid form or as an aqueous solution. Preferably, an amine disulfonate salt having the formula $HN(SO_3X)_2$, where X is a metal selected from the group consisting of alkali metals and alkaline earth metals, or a hydroxylamine monosulfonate salt having the formula $HO-NH-(SO_3X)$, where X is a metal selected from the group consisting of alkali metals or alkaline earth metals, is used. The amine disulfonate salt, preferably of potassium or sodium, may be produced on site and fed to the aqueous scrubber liquor or can be made elsewhere and provided for addition to the aqueous scrubbing liquor. Potassium nitrilosulfonate, $HN(SO_3K)_2$, for example, can be prepared according to the procedure described by H. Sisler and L. F. Audrieth, described in the article "Potassium Nitrilosulfonate", *J Am Chem. Soc.*, Vol 60, pp 1947–48 (1938). Examples of other useful salt compounds of the ions of the above general formula are alkali metal or alkaline earth metal salts of hydroxylamine disulfonate (HADS), alkali metal or alkaline earth metal salts of hydroxylamine monosulfonate (HAMS), and alkali metal or alkaline earth metal salts of amine disulfonate (ADS).

In another embodiment of the present process, the amine sulfonate ions can be provided by adding to the magnesium-enhanced aqueous lime scrubbing medium a portion of an effluent stream from a wet scrubbing unit used to remove nitrogen oxides from a gaseous stream, wherein a metal chelate is used, which effluent stream contains a hydroxylamine N-sulfonate such as hydroxylamine disulfonate. The removal of nitrogen oxides along with sulfur dioxide from gaseous streams using metal chelates, such as ferrous ethylenediaminetetraacetic acid (Fe(II)EDTA) is described, for example by S. Chang in an article entitled "Effects of Metal Chelates on Wet Flue Gas Scrubbing Chemistry", *Environmental Science Technology*, pp 649–653 Nov. 1983. Such processes, using ferrous ethylenediaminetetraacidic acid have been developed and are known, as described, for example in U.S. Pat. Nos. 4,612,175, 4,670,234, 4,957,716, and 5,200,160, all of which are incorporated by reference herein. The scrubbing liquors of such nitrogen oxide-sulfur dioxide scrubbing processes result in the production of amine sulfonates, such as amine trisulfonates and amine disulfonates, and hydroxylamine N-sulfonates (HANS) such as hydroxylamine disulfonate (HADS), and hydroxylamine monosulfonate (HAMS). A portion of the aqueous effluent liquor may be added, or the aqueous effluent can be concentrated and a concentrated portion or solids resulting can be added.

The amount of amine sulfonate ions added to the magnesium-enhanced aqueous lime scrubbing medium should be an effective amount, usually at least about 10 millimoles, and preferably between about 10–800 millimoles.

Referring now to FIG. 1, an embodiment of the present process is schematically illustrated showing a wet scrubbing unit 1, in which an aqueous lime scrubbing slurry is contacted with flue gases. The aqueous lime scrubbing slurry is added to a recycle and hold tank 3, through line 5 and passed through line 7, by means of pump 9, into the wet scrubbing unit 1 through spray nozzles 11. The hot flue gas, containing sulfur dioxide, is charged to the wet scrubbing unit 1 through line 13 and passes countercurrent to the aqueous scrubbing medium, with sulfur dioxide removed therefrom and clean gases discharged from the wet scrubbing unit 1 through gas outlet 15. The aqueous scrubbing medium, after contact with the gases is passed to the recycle and hold tank 3. A bleed stream is taken from recycle line 7 through line 17 and passed to a thickener 19 where solids, primarily calcium sulfite solids, are separated therefrom and discharged as a thickener underflow through line 21 for disposal. The clarified liquor, or overflow, from the thickener 19 is removed through line 23 and may be discharged through line 25 or recycled to the wet scrubbing unit, preferably to wash demister devices 27 in the wet scrubbing unit 1. The system thus described is a known system for the removal of sulfur dioxide from hot flue gas streams using a magnesium-enhanced aqueous lime scrubbing medium. In accordance with the present process, a source of an amine sulfonate ion 29 is provided, and the same is charged through line 31 to the recycle and hold tank 3 for admixture with the magnesium-enhanced aqueous lime scrubbing medium in an amount that will provide at least 10 millimoles of such ions in the aqueous scrubbing medium in the wet scrubbing unit 1. Or, the amine sulfonate ions can be added elsewhere in the scrubbing system, such as by line 31 through line 33 to the thickener 19, provided that the amount of said ions returned to and present in the wet scrubbing unit 1 is at least about 10 millimoles.

Figure 2:
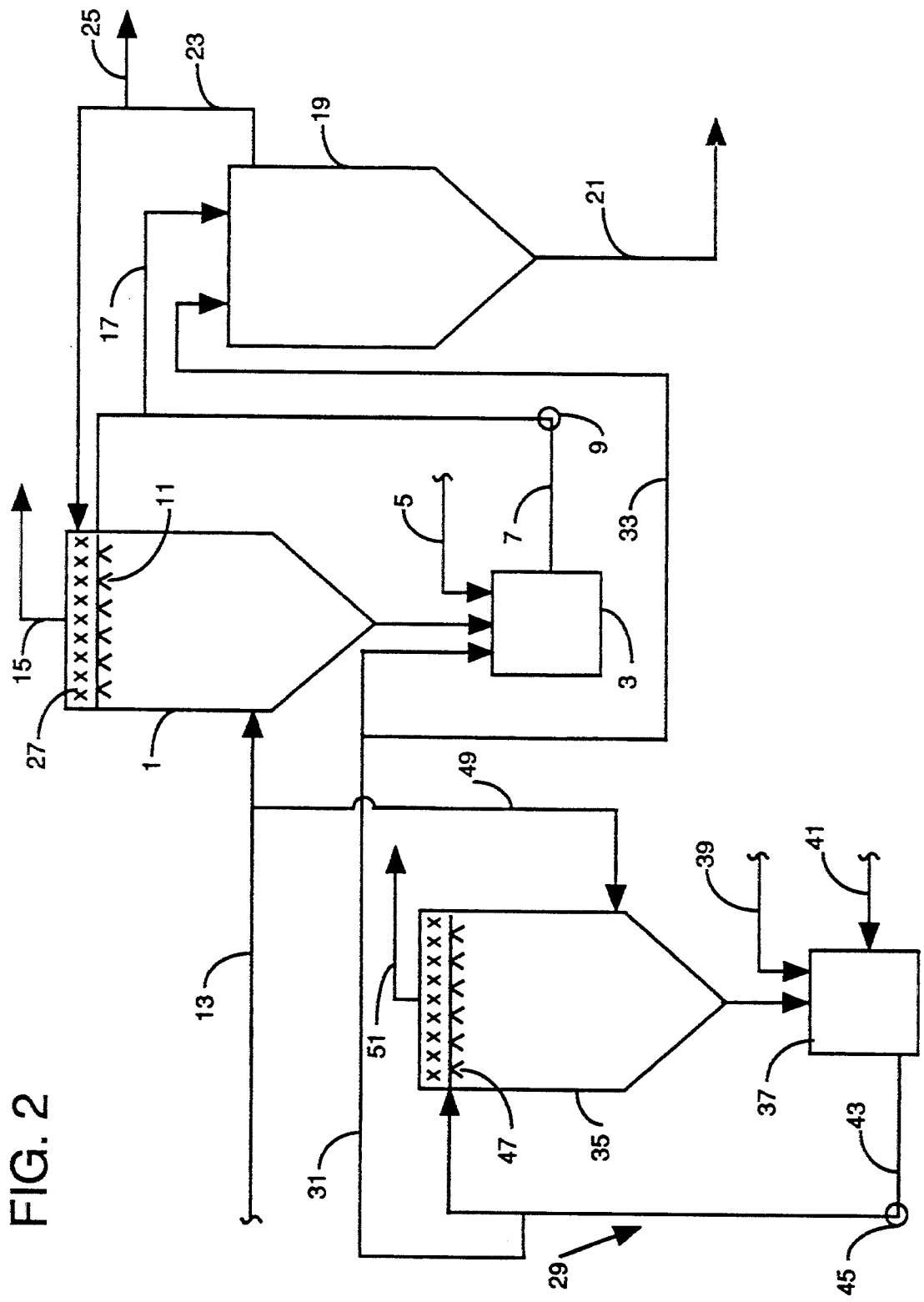
FIG. 2 is a schematic illustration of another embodiment of the process of the present invention.

Referring now to FIG. 2, another embodiment of the present invention is illustrated wherein the source of amine sulfonate ions 29 is a portion of the effluent stream from a scrubbing unit for nitrogen oxides containing a metal chelate. As shown, the source of amine sulfonate ions 29 comprise a second wet scrubbing unit 35 with a second recycle and hold tank 37 to which an aqueous lime slurry is charged through line 39 and a metal chelate, such as ethylenediaminetetraacidic acid (EDTA) is added through line 41. The aqueous medium from second recycle tank 37 is passed through line 43, by means of pump 45 to spray nozzles 47 in the second wet scrubbing unit 35. A portion of hot flue gases from line 13 are diverted through line 49 to the second wet scrubbing unit 35 and passed countercurrently to the aqueous scrubbing medium therein. The reaction of the aqueous scrubbing medium containing the EDTA removes sulfur dioxide and nitrogen oxides from the hot flue gases, with clean gas discharged through line 51. A bleed stream from line 43 will contain amine sulfonate ions which are charged to first recycle and hold tank 3 by means of line 31 or to the thickener 19 by means of line 33.

EXAMPLE I

A one liter bench scale system was set up having a one-liter beaker contained in a temperature-controlled water bath. A stirrer was provided within the beaker for stirring of a synthetic scrubbing liquor which consisted mainly of $MgSO_3$ and was free of suspended solids. Added to the synthetic scrubbing liquor was a lime slurry containing 20% lime by weight. A pH probe was provided to monitor the pH of the content in the beaker. A stream of $H_2SO_3$ was pumped into the beaker at a constant rate.

In a control (Control) test no additive was added to the synthetic scrubbing liquor in the beaker, while in repeat tests (a–h), various amounts (millimoles, mM) of potassium amine disulfonate salt (KADS) were added to the beaker. The pH of the synthetic scrubbing liquor was maintained at 6.5 by addition of the 20% lime slurry during pumping of a 3% $H_2SO_3$ solution into the beaker at a constant rate. The crystals produced, predominantly calcium sulfite, in the beaker were filtered 30 minutes after the addition of the KADS. The wet cake was dried and the solids content determined. The results of the solids contents in the filter cakes from these tests are listed in TABLE I.

TABLE I

| Test | Amount of KADS (mM) | Filter Cake Solids (% by weight) |
|---|---|---|
| Control | 0 | 38.0 |
| a | 11.8 | 42.3 |
| b | 23.7 | 44.8 |
| c | 47.4 | 41.9 |
| d | 55.0 | 37.7 |
| e | 75.0 | 43.6 |
| f | 94.7 | 54.3 |
| g | 142.1 | 59.2 |
| h | 200.0 | 46.7 |

EXAMPLE II

A further series of tests were run using the one liter bench scale system as described in Example I, where the additive (amine sulfonate ions) to the synthetic scrubbing solution was generated by evaporating water from a combined $SO_2/NO_x$ removal process liquor. The synthetic scrubbing solution, prior to evaporation, contained, per 10 liters of solution; 140 grams $Mg(OH)_2$, 80 ml of 98% $H_2SO_4$, 1000 ml aqueous $H_2SO_3$ (6% $SO_2$), 278 grams $FeSO_4.7H_2O$, and 365.31 grams EDTA. The residual solids from the liquor were dried and the amine disulfonate (ADS) concentration in the dried solids was found by ion chromatography (IC) measurement to be 16.7%. The amounts of the residual solids added are indicated in TABLE II, as are the results of the solids contents in the filter cakes. The crystals generated were predominantly calcium sulfite.

TABLE II

| Test | Amount of Additive (ppm) | Amount of (ADS) mM | Filter Cake Solids (% by weight) |
|---|---|---|---|
| Control | 0 | 0 | 38 |
| a | 3000 | 2.86 | 39.7 |
| b | 6000 | 5.72 | 37.3 |
| c | 24000 | 22.90 | 44.2 |
| d | 78000 | 74.43 | 49.5 |
| e | 154000 | 146.96 | 63.6 |

EXAMPLE III 5 kW Tests of Potassium Amine Disulfonate (K-ADS)

A baseline test using synthetic liquors was first conducted. The filtercakes were first rinsed with 50 mL of D.I. water. Listed below are the values of the solids contents in the rinsed filter cakes measured by the Denver Model 100 Infrared Moisture Analyzer. They are rather constant and the averaged value is 32.7 wt %.

| | 5kW Baseline Test | |
|---|---|---|
| Clock Time | Elapsed Time (Hr) | Filtercake Solids (wt %) |
| 1130 Hr | 1.25 | 32.54 |
| 1300 Hr | 2.75 | 32.43 |
| 1430 Hr | 4.25 | 32.76 |
| 1600 Hr | 5.75 | 33.07 |
| | average: | 32.7% |

The liquors left in the recycle tank and the thickener from the baseline test were then used on the next day. The K-ADS was introduced at a rate of ~140 g per shot immediately after each recycle tank liquor sample was taken. The ADS concentrations, [ADS], in the filtrates and rinsates were measured by IC. The values of filtercake solids contents are listed below. With the additions of K-ADS, the solids content increased gradually from ~31 to wt %.

| | | First 5kW Test of K-ADS | | | |
|---|---|---|---|---|---|
| Clock Time | Elapsed Time (Hr) | Filtercake Solids (wt %) | Filtrate [ADS] (mM) | Rinsate [ADS] (mM) | K-ADS Added (g) |
| 1000 Hr | 0 | — | — | — | none |
| 1030 Hr | 0.5 | 31.06 | 1.4 | — | 141.1 |
| 1130 Hr | 1.5 | 32.24 | 33.4 | 4.98 | 140.6 |
| 1230 Hr | 2.5 | 35.50 | 68.8 | 10.0 | 141.2 |
| 1330 Hr | 3.5 | 38.17 | 102.4 | 13.4 | 140.8 |
| 1430 Hr | 4.5 | 37.94 | 150.4 | 21.4 | 140.5 |
| 1530 Hr | 5.5 | 41.19 | 151.9 | 25.1 | shut down |
| | | 40.87 (duplicate) | | | |

Liquors left from the first K-ADS test were re-used on the next day. The supernatant liquid in the recycle tank was first sampled at 0900 Hr and the [ADS] was measured by IC to be 159.9 mM. The thickener was then drained and filled with fresh synthetic liquor. After the 1130 Hr recycle tank sample was taken, 70.2 g of K-ADS was added. This ADS test was shut down prematurely, due to the unstable gas flow. The solids contents of the rinsed cakes are listed below.

| Second 5kW Test of K-ADS | | | | |
|---|---|---|---|---|
| Clock Time | Elapsed Time (Hr) | Filtercake Solids (wt %) | Filtrate [ADS] (mM) | Rinsate [ADS] (mM) | K-ADS Added (g) |
| 0945 Hr | 0 | — | — | | start-up |
| 1030 Hr | 0.5* | 36.88 | 109.8 | 9.49 | 0 |
| 1130 Hr | 1.5 | 38.36 | 111.2 | 13.8 | 70.2 |
| 1230 Hr | 2.5 | 35.91 | 134.1 | 18.4 | 0 |
| | | 38.52 (duplicate) | | | |

*The elapsed time was shortened by 0.25 hours due to a pH excursion.

A third test was conducted four days later, by re-using the liquors left in the recycle tank and the thickener from the second test. The K-ADS was added right after the 1030 Hr recycle tank sample was taken. Again, this test was prematurely shut down due to the unstable gas flow. The [ADS] in the filtrates were estimated, because the IC was not available. The solids contents of two un-rinsed and one rinsed filtercakes are listed below.

| Third 5kW Test of K-ADS | | | | |
|---|---|---|---|---|
| Clock Time | Elasped Time (Hr) | Filtercake Solid (wt %) | Est. Filtrate [ADS] (mM) | K-ADS Added (g) |
| 1000 Hr | 0 | — | ~120 | (start-up) |
| 1030 Hr | 0.5 | 38.66 | ~120 | 40.3 |
| 1130 Hr | 1.5 | 44.76 | ~130 | (shut down) |
| | | 31.81 (rinsed cake) | | |

Results from the above K-ADS tests shown that improvements of sludge dewaterability were made after the additions of K-ADS. Furthermore, the solids settled in the thickener very fast. However, there is no explanation for the huge differences between the un-rinsed and rinsed cakes from the 1130 Hr sample from the last test.

EXAMPLE IV 5 kW Tests of Sodium Amine Disulfonates (Na-ADS)

Results from the first 5 kW K-ADS test indicate that the solubility of K-ADS may be at ~150 mM.

The first batch of Na-ADS was synthesized following the recipe for making K-ADS. The main difference was that sodium nitrite (NaNO$_2$) and sodium metabisulfite (Na$_2$S$_2$O$_5$), instead of the respective potassium salts, were used. This batch of Na-ADS containing solution was labeled as A. No crystal formed and the [ADS] in this batch was measured by IC to be 637 mM. The first Na-ADS test was conducted the next day by using synthetic liquors to jump-start the test. Results from this test are listed below. The solids content in the filtercake from the first recycle tank sample was 34.9 wt %, which was considered to be the baseline value because no Na-ADS was added yet. Forty five minutes later, 1,300 mL of Na-ADS solution were added. The solids content in the filtercake from the last recycle tank sample was 37.3 wt %. The measured [ADS] in the corresponding filtrate was 52.5 mM.

| First 5kW Test of NA-ADS | | | |
|---|---|---|---|
| Elapsed Time (Hr) | Filtercake Solids (wt %) | Filtrate [ADS] (mM) | Na-ADS (A) Added (mL) |
| 0 | — | — | (start-up) |
| 2.0 | 34.9 | — | baseline |
| 2.75 | — | — | 1,300 |
| 4.0 | 37.3 | 52.5 | — |

A second batch of Na-ADS solution was synthesized and labeled as B. Liquors left from the above test were re-used two days later. Results from this test are tabulated below. The solids content in the first recycle tank liquor sample was 38.8 wt %. The [ADS] in the corresponding filtrate and rinsate were 41 and 2.8 mM, respectively. Immediately after this recycle tank sample was taken, 800 mL of Na-ADS solution were added. As more Na-ADS was added, the solids content of the rinsed filtercakes increased. The solids content in the filtercake from the last recycle tank liquor sample was 49.3 wt %. The [ADS] in the corresponding filtrate and rinsate were 137 and 8.0 mM, respectively.

| Second 5kW Test of NA-ADS | | | | |
|---|---|---|---|---|
| Clock Time | Elapsed Time (Hr) | Filtercake Solids (wt %) | Filtrate [ADS] (mM) | Rinsate [ADS] (mM) | Na-ADS (B) Added (mL) |
| 1030 Hr | 0 | | | | (start-up) |
| 1100 Hr | 0.5 | 38.8 | 41.0 | 2.8 | 800 |
| 1200 Hr | 1.5 | 38.0 | 68.8 | 4.2 | 500 |
| 1300 Hr | 2.5 | 40.4 | 84.4 | 5.7 | 500 |
| 1400 Hr | 3.5 | 44.7 | 102.0 | 6.5 | 500 |
| 1500 Hr | 4.5 | 46.5 | 117.0 | 6.7 | 520 |
| 1600 Hr | 5.5 | 49.3 | 137.0 | 8.0 | shut down |

Results from the above Na-ADS tests show that improvements of sludge dewaterability by ~10 percentage points were made after the additions of Na-ADS.

What is claimed is:

1. A process for removing sulfur dioxide from a gaseous stream by contact with an aqueous scrubbing medium containing lime and a magnesium ion content of between about 2,500 to 10,000 parts per million in a wet scrubbing unit, where calcium sulfite solids are produced and removed as an effluent from the wet scrubbing unit as an aqueous sludge, comprising:

adding to said aqueous scrubbing medium in said aqueous scrubbing unit at least one amine sulfonate ion of the formula:

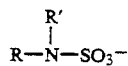

where R is H or OH, and R' is H or $SO_3$, with R and R' not both being H;

as a dewatering aid for said calcium sulfite in said aqueous sludge.

2. A process for removing sulfur dioxide from a gaseous stream as defined in claim 1 wherein said amine sulfonate ion added to said aqueous scrubbing medium is an amine disulfonate salt having the formula $HN(SO_3X)_2$ wherein X is a metal selected from the group consisting of alkali metals and alkaline earth metals.

3. A process for removing sulfur dioxide from a gaseous stream as defined in claim 1 wherein said amine sulfonate ion added to said aqueous scrubbing medium is a hydroxylamine monosulfonate salt having the formula $HO—NH—(SO_3X)$ wherein X is a metal selected from the group consisting of alkali metals and alkaline earth metals.

4. A process for removing sulfur dioxide from a gaseous stream as defined in claim 1 wherein said amine sulfonate ion added to said aqueous scrubbing medium is a portion of an effluent stream from a scrubbing unit for nitrogen oxides, containing a metal chelate, which effluent stream contains a hydroxylamine N-sulfonate.

5. A process for removing sulfur dioxide from a gaseous stream as defined in claim 4 wherein said hydroxylamine N-sulfonate is hydroxylamine-disulfonate.

6. The process for removing sulfur dioxide from a gaseous stream as defined in claim 4 wherein said amine sulfonate ion is present in said aqueous scrubbing medium in an amount of at least 10 millimoles.

7. A process for removing sulfur dioxide from a gaseous stream by contact with an aqueous scrubbing medium containing lime and a magnesium ion content of between about 2,500 to 10,000 parts per million in a wet scrubbing unit, where calcium sulfite solids are produced and removed as an effluent from the wet scrubbing unit as an aqueous sludge, comprising:

adding to said aqueous scrubbing medium in said aqueous scrubbing unit at least 10 millimoles of an amine disulfonate salt having the formula $HN(SO_3X)_2$ wherein X is a metal selected from the group consisting of alkali metals and alkaline earth metals as a dewatering aid for said calcium sulfite in said aqueous sludge.

8. A process for removing sulfur dioxide from a gaseous stream as defined in claim 7 wherein said alkali metal is potassium.

9. A process for removing sulfur dioxide from a gaseous stream as defined in claim 7 wherein said alkali metal is sodium.

10. A process for removing sulfur dioxide from a gaseous stream by contact with an aqueous scrubbing medium containing lime and a magnesium ion content of between about 2,500 to 10,000 parts per million in a wet scrubbing unit, where calcium sulfite solids are produced and removed as an effluent from the wet scrubbing unit as an aqueous sludge, comprising:

adding to said aqueous scrubbing medium in said aqueous scrubbing unit at least 10 millimoles of an hydroxylamine monosulfonate salt having the formula $HO—NH(SO_3X)$ wherein X is a metal selected from the group consisting of alkali metals and alkaline earth metals as a dewatering agent for said calcium sulfite in said aqueous sludge.

11. A process for removing sulfur dioxide from a gaseous stream as defined in claim 10 wherein said alkali metal is potassium.

12. A process for removing sulfur dioxide from a gaseous stream as defined in claim 10 wherein said alkali metal is sodium.

13. A process for removing sulfur dioxide from a gaseous stream by contact with an aqueous scrubbing medium containing lime and a magnesium ion content of between about 2,500 to 10,000 parts per million in a wet scrubbing unit, where calcium sulfite solids are produced and removed as an effluent from the wet scrubbing unit as an aqueous sludge, comprising:

adding to said aqueous scrubbing medium in said aqueous scrubbing unit a portion of an effluent stream from a scrubbing unit for nitrogen oxides, containing a metal chelate, which portion contains at least 10 millimoles of a hydroxylamine N-sulfonate.

14. A process for removing sulfur dioxide from a gaseous stream as defined in claim 13 wherein said hydroxylamine N-sulfonate is hydroxylamine-disulfonate.

* * * * *